(12) United States Patent
Soryal (10) Patent No.: US 11,453,408 B2
(45) Date of Patent: Sep. 27, 2022

(54) TAMPER-RESISTANT SENSOR FOR AUTONOMOUS VEHICLES (71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 259 days.

(21) Appl. No.: 16/452,780

(22) Filed: Jun. 26, 2019

(65) Prior Publication Data
US 2020/0406908 A1 Dec. 31, 2020

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2018.01) |
| *G07C 5/00* | (2006.01) |
| *B60W 50/02* | (2012.01) |
| *B60R 11/04* | (2006.01) |
| *G07C 5/08* | (2006.01) |
| *G05D 1/00* | (2006.01) |

(52) U.S. Cl.
CPC ........ *B60W 50/0205* (2013.01); *B60R 11/04* (2013.01); *G05D 1/0088* (2013.01); *G07C 5/0841* (2013.01); *B60W 2050/0215* (2013.01)

(58) Field of Classification Search
CPC ..... B60W 50/0205; B60W 2050/0215; B60W 50/023; B60W 2420/42; B60W 60/00188; B60R 11/04; G07C 5/0841; G05D 1/0088
USPC .......................................... 701/29.2
See application file for complete search history.

(56) References Cited

U.S. PATENT DOCUMENTS

| | | | |
|---|---|---|---|
| 2016/0243988 A1* | 8/2016 | Peterson | G06K 9/00805 |
| 2019/0222652 A1* | 7/2019 | Graefe | H04W 4/40 |
| 2020/0331407 A1* | 10/2020 | Cao | H04N 5/2252 |
| 2020/0331496 A1* | 10/2020 | Cao | G01S 15/931 |
| 2020/0361480 A1* | 11/2020 | Rodriguez Bravo | B60W 50/14 |

* cited by examiner

*Primary Examiner* — Mahmoud S Ismail (57) ABSTRACT

In one example, a method for resolving sensor conflicts in autonomous vehicles includes monitoring conditions around the autonomous vehicle by analyzing data received from a plurality of sensors, detecting a conflict in the data received from two sensors of the plurality of sensors, sending a first instruction to an auxiliary sensor of the autonomous vehicle that is not one of the plurality of sensors, wherein the first instruction instructs the auxiliary sensor to gather additional data about the conditions around the autonomous vehicle, receiving the additional data from the auxiliary sensor, and making a decision regarding operation of the autonomous vehicle, wherein the decision is based at least in part on the additional data.

20 Claims, 6 Drawing Sheets

FIG. 5

TAMPER-RESISTANT SENSOR FOR AUTONOMOUS VEHICLES

The present disclosure relates generally to autonomous vehicles, and relates more particularly to tamper-resistant sensors for resolving sensor conflicts in autonomous vehicles.

BACKGROUND

Autonomous vehicles (also referred to as self-driving or driverless vehicles) are vehicles that are capable of operating with little to no human control. Some autonomous vehicles utilize a plurality of different types of sensors (e.g., radio detection and ranging (radar), light detection and ranging (LIDAR), sonar, global positioning system (GPS), odometry and inertial measurement units, and the like) and data feeds (e.g., traffic reports, weather reports, and the like) to gather inputs from the surrounding environment. These inputs may include, for example, the information displayed on road signs, the current weather or road conditions, the presence of obstacles, and the like. A control system may then analyze these inputs in order to make decisions regarding the operation of the vehicle (e.g., direction of travel, speed of travel, use of vehicle systems such as headlights and windshield wipers, etc.). Thus, autonomous vehicles are seen as a way of minimizing the effects of human error in vehicle operation.

SUMMARY

The present disclosure describes a tamper-resistant sensor for use in resolving sensor conflicts in autonomous vehicles. In one example, a method for resolving sensor conflicts in autonomous vehicles includes monitoring conditions around the autonomous vehicle by analyzing data received from a plurality of sensors, detecting a conflict in the data received from two sensors of the plurality of sensors, sending a first instruction to an auxiliary sensor of the autonomous vehicle that is not one of the plurality of sensors, wherein the first instruction instructs the auxiliary sensor to gather additional data about the conditions around the autonomous vehicle, receiving the additional data from the auxiliary sensor, and making a decision regarding operation of the autonomous vehicle, wherein the decision is based at least in part on the additional data.

In another example, a non-transitory computer-readable storage medium stores instructions which, when executed by a processing system of an autonomous vehicle, cause the processing system to perform operations. The operations include monitoring conditions around the autonomous vehicle by analyzing data received from a plurality of sensors, detecting a conflict in the data received from two sensors of the plurality of sensors, sending a first instruction to an auxiliary sensor of the autonomous vehicle that is not one of the plurality of sensors, wherein the first instruction instructs the auxiliary sensor to gather additional data about the conditions around the autonomous vehicle, receiving the additional data from the auxiliary sensor, and making a decision regarding operation of the autonomous vehicle, wherein the decision is based at least in part on the additional data.

In another example, a system includes a plurality of sensors distributed throughout an autonomous vehicle to continuously gather data about conditions around the autonomous vehicle, a processing system to monitor the conditions based the data gathered by the plurality of sensors, an auxiliary sensor mounted in the autonomous vehicle, wherein the auxiliary sensor operates in an inactive mode as a default, and wherein the auxiliary sensor does not gather data or transmit data in the inactive mode, and a non-transitory computer-readable storage medium storing instructions which, when executed by the processing system, cause the processing system to perform operations. The operations include monitoring conditions around the autonomous vehicle by analyzing data received from a plurality of sensors, detecting a conflict in the data received from two sensors of the plurality of sensors, sending a first instruction to an auxiliary sensor of the autonomous vehicle that is not one of the plurality of sensors, wherein the first instruction instructs the auxiliary sensor to gather additional data about the conditions around the autonomous vehicle, receiving the additional data from the auxiliary sensor, and making a decision regarding operation of the autonomous vehicle, wherein the decision is based at least in part on the additional data.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides tamper-resistant sensors for resolving sensor conflicts in autonomous vehicles. As discussed above, autonomous vehicles are seen as a way of minimizing the effects of human error in vehicle operation. However, the very same features that replace human control (e.g., constant connectivity, software) may also make the autonomous vehicles more susceptible to compromise from outside parties. For instance, hackers may exploit vulnerabilities in the software of an autonomous vehicle's control system. This may allow malicious parties to intercept and/or manipulate communications between the control system and the sensors or other vehicle systems.

As an example, a hacker may manipulate a sensor feed and/or a returned signal from a sensor in order to give the control system the false impression that there is an obstacle in the vehicle's path. For instance, an image feed from a camera may be manipulated to make a nonexistent object appear to be moving slowly or to be stopped in the vehicle's path. As a result, the control system may unnecessarily take an action, such as slowing or stopping the vehicle or suddenly swerving from the vehicle's path. This action, may, in turn, create a safety hazard as other vehicles on the road may need to adapt to the action in order to avoid a collision.

Furthermore, due to the number of internal and external sensor feeds being processed by the control system, when any of the feeds from the sensors are being maliciously manipulated, a conflict may arise between the data being received from two or more sensors. For instance, the data feed generated by a radar sensor may be manipulated to indicate that there is an obstacle in the vehicle's path. However, the data feed generated by a LIDAR sensor, which is not being manipulated, may indicate that the vehicle's path is clear. This conflict may confuse the vehicle's control system and make it difficult for the control system to take appropriate actions in a timely manner.

Examples of the present disclosure provide an auxiliary sensor in an autonomous vehicle, where the auxiliary sensor is deployed for resolving conflicts in the signals from other sensors. In one example, the auxiliary sensor is a camera comprising a minimal amount of electronics and internal components, thereby making the auxiliary sensor more resistant to outside manipulation. Moreover, the auxiliary sensor may be activated only when a conflict is detected in the signals from the other sensors, which reduces the window of time during which the auxiliary sensor may be exposed to attack. At all other times, the auxiliary sensor may remain in an idle or powered down mode. In further examples, the auxiliary sensor may be protected within a housing that is formed from a material that is resistant to wireless electronic signals (e.g., passing carrier waves, signals, lasers, and the like).

Although examples of the present disclosure are described within the context of autonomous vehicles, it will be appreciated that the examples described herein could also be used in conjunction with vehicles that are not fully autonomous. For instance, the Society of Automotive Engineers (SAE) defines a wide range of vehicles that operate with varying degrees of automation, from SAE Level 0 (i.e., fully manually operated) to SAE Level 5 (fully autonomous). The levels in between SAE Levels 0 and Level 5 include various types of semi-autonomous vehicles (e.g., vehicles that are neither fully manually operated nor fully autonomous). These levels between include vehicles that operate with "driver assistance" (e.g., automated systems used for either steering or acceleration/deceleration), "partial automation" (e.g., automated systems used for both steering and acceleration/deceleration), "conditional automation" (e.g., automated systems that rely on a response of a human driver to requests for intervention in dynamic driving tasks), and "high automation" (e.g., automated systems that take action in dynamic driving tasks even when the human driver does not respond to requests for intervention). Examples of the present disclosure may be used in conjunction with any of these levels (e.g., SAE Levels 0-5) of automation, as well as levels of automation that may have yet to be explicitly defined.

Figure 1:
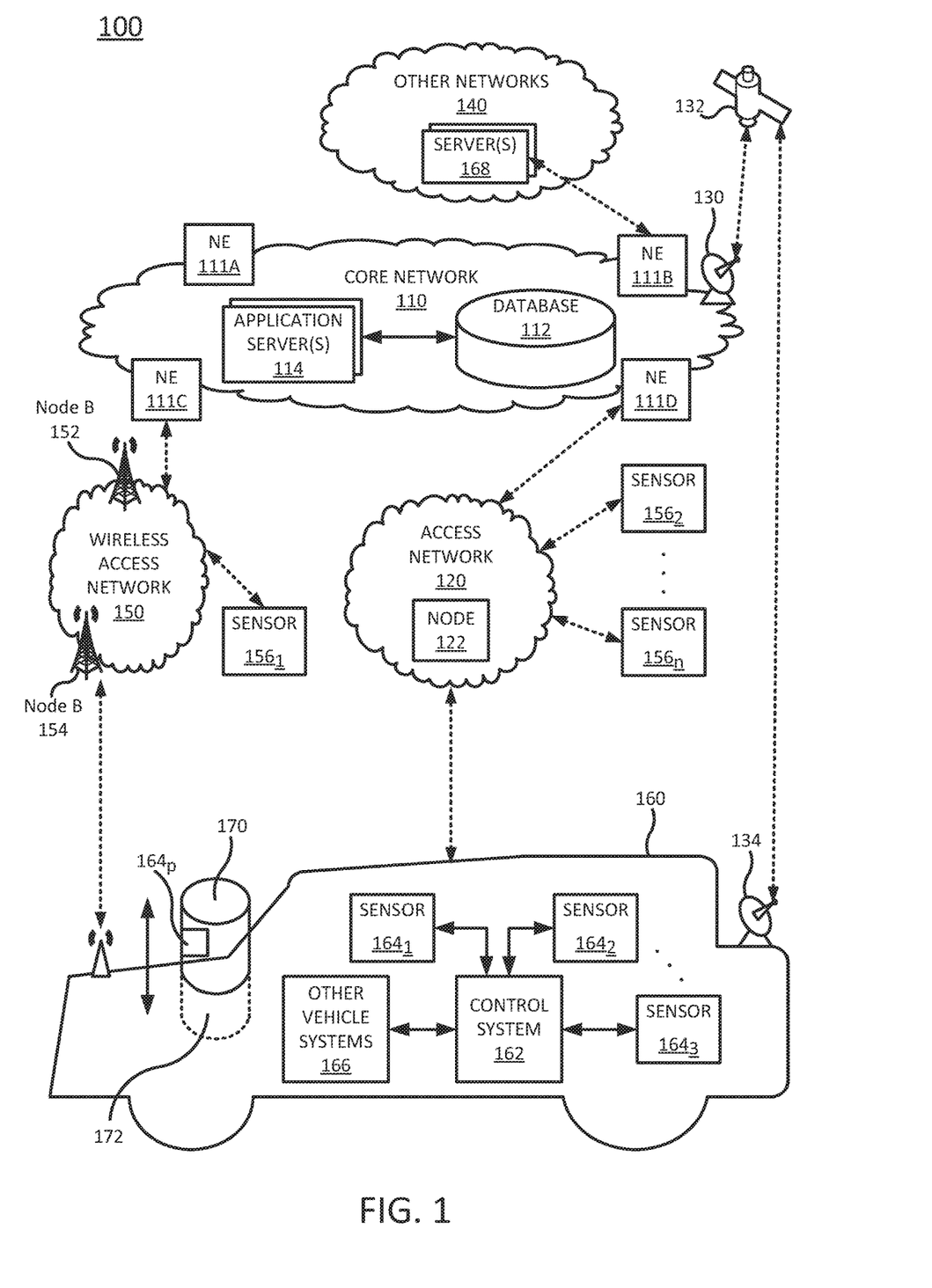
FIG. 1 illustrates an example system in which examples of the present disclosure for tamper-resistant sensors may operate.

To further aid in understanding the present disclosure, FIG. 1 illustrates an example system 100 in which examples of the present disclosure for tamper-resistant sensors may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

As shown in FIG. 1, the network 100 connects a plurality of mobile and non-mobile devices, including an autonomous vehicle 160 and a first plurality of sensors $156_1$-$156_n$ (hereinafter individually referred to as a "sensor 156" or collectively referred to as "sensors 156"), with one another and with various other devices via a core network 110, a wireless access network 150 (e.g., a cellular network), an access network 120, other networks 140, and/or the Internet in general. For instance, connections between core network 110, access network 120, autonomous vehicle 160, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 154 may each comprise a Node B or evolved Node B (eNodeB). In one example, wireless access network 150 may be controlled and/or operated by a same entity as core network 110.

In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements $111_1$-$111_m$ (hereinafter individually referred to as a "network element 111" or collectively as "network elements 111") may serve as gateway servers or edge routers to interconnect the core network 110 with other networks 140, wireless access network 150, access network 120, and so forth. As shown in FIG. 1, core network 110 may also include a plurality of application servers 114 and a database 112. For ease of illustration, various additional elements of core network 110 are omitted from FIG. 1.

In one example, the access network 120 may comprise a Digital Subscriber Line (DSL) network, a broadband cable access network, a Local Area Network (LAN), a cellular or wireless access network, a 3$^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between the autonomous vehicle 160 and core network 110 relating to data collected by sensors 156, communications with web servers via other networks 140, and/or the Internet in general, and so forth. In another example, access network 120 may be operated by a different entity from core network 110, e.g., an Internet service provider (ISP) network.

Alternatively, or in addition, the network 100 may provide data services to the autonomous vehicle 160 via satellite broadcast. For instance, ground station 130 may receive data from the application server(s) 114, database 112, wireless access network 150, other networks 140, and/or the Internet in general for uplink transmission to the satellite 132. Accordingly, the satellite 132 may receive data from the ground station 130 and may broadcast the data to a satellite receiver 134, e.g., a satellite link terrestrial antenna (including satellite dishes and antennas for downlink communications, or for both downlink and uplink communications), as well as to satellite receivers of other subscribers within a coverage area of satellite the satellite 132. In one example, satellite 132 may be controlled and/or operated by a same network service provider as the core network 110. In another example, satellite 132 may be controlled and/or operated by a different entity and may carry data signals on behalf of the core network 110.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application server(s) 114 may also include a presence server, e.g., for detecting a presence of a user. For example, the presence server may determine the physical location of a user or whether the user is "present" for the purpose of a subscribed service, e.g., online for a chatting service and the like. In one example, application server(s) 114 may perform processing on data feeds received from the sensors 156, e.g., to extract information from the data feeds, where the information may subsequently be forwarded to downstream devices. For instance, the application server(s) 114 may detect current weather conditions in a geographic location of a sensor 156 based on the information (e.g., images, humidity levels, temperature readings, etc.) in the sensor's data feed. The application server(s) 114 may also perform pre-processing on the raw data feeds (e.g., reduction of noise, motion blur, or the like) so that the raw data feeds may be more easily interpreted by downstream devices. In one example, the sensors 56 are continuously in data gathering mode (e.g., always gathering and transmitting data), unless the sensors 164 are damaged or malfunctioning.

The database 112 may store information extracted from data feeds. In one example, the information extracted from the data feeds may be stored temporarily (e.g., discarded once the data feed reaches a threshold age) in order to avoid dedicating storage space to data that may no longer be timely. In another example, the database 112 may store models that help the application server(s) 114 to interpret the information contained in the data feeds. It should be noted that the foregoing are only several examples of the types of relevant application server(s) 114 and databases 112 that may be included in core network 110 for storing information relevant to providing various services to subscribers.

In accordance with the present disclosure, other networks 140 and servers 168 may comprise networks and devices of various content providers who may also maintain sensors that provide data about road, weather, and other conditions which may be relevant to the operation of the autonomous vehicle.

In one example, the sensors 156 may comprise various types of sensors (e.g., still and/or video cameras, humidity sensors, thermometers, barometers, and the like) that may be distributed along or near a roadway in order to monitor conditions in the vicinity of the roadway (e.g., traffic flows, weather, obstructions, etc.). The sensors 156 may provide data (e.g., in the form of continuous feeds and/or discrete data points) to the application server(s) 114 in the core network 110. The sensors 156 may also provide the data directly to the autonomous vehicle 160.

In one example, the autonomous vehicle 116 may comprise a motor vehicle (e.g., a passenger vehicle, a tractor trailer, a bus, or the like) that is equipped with a system that provides some level of autonomous operation. This system may include, for example, a control system 162 and a second plurality of sensors $164_1$-$164_p$ (hereinafter individually referred to as a "sensor 164" or collectively referred to as "sensors 164"). The sensors 164 may be distributed throughout the autonomous vehicle 160 (e.g., inside the autonomous vehicle 160 and/or outside the autonomous vehicle 160) and may include different types of sensors including radar sensors, LIDAR sensors, sonar sensors, GPS sensors, odometry and inertial measurement units, still and/or video cameras, humidity sensors, thermometers, barometers, and/or the like. The sensors 164 gather inputs from the environment surrounding the autonomous vehicle 160. These inputs may include, for example, the information displayed on road signs, the current weather or road conditions, the presence of obstacles, and the like. In one example, the sensors 164 are continuously in data gathering mode (e.g., always gathering and transmitting data to the control system 162), unless the sensors 164 are damaged or malfunctioning.

The control system 162 may comprise all or a portion of a computing device or system, such as computing system 500, and/or processing system 502 as described in connection with FIG. 5 below, specifically configured to perform various steps, functions, and/or operations for resolving conflicts in sensor data. For instance, the control system, 162 may be configured to analyze the inputs from the sensors 164 and/or the sensors 156. Based on analysis of the sensor inputs, the control system 162 may make decisions regarding the operation of the vehicle (e.g., direction of travel, speed of travel, use of vehicle systems such as headlights and windshield wipers, etc.) and may send signals to other vehicle systems 166 in the autonomous vehicle 160 to carry out the decisions. For instance, the control system 162 may determine, based on analysis of road images, that an obstacle is present in the road ahead of the autonomous vehicle 160. In response, the control system 162 may send a signal to the autonomous vehicle's braking system to apply the brakes (e.g., to slow down the speed of the autonomous vehicle 160). Alternatively the control system 162 may send a signal to the autonomous vehicle's steering system to steer to the left or the right by some specified amount (e.g., to steer the autonomous vehicle 160 around the obstacle).

The sensors 164 that are deployed within the autonomous vehicle 160 may be in direct communication with the control system 162 (e.g., via wired and/or wireless links). The sensors 164 may also communicate with the application server(s) 114 in the core network 110 and/or servers 168 in other networks 140 via the access network 120 and/or via satellite receiver 134. The data from the sensors 156 that are not in direct communication with the control system 162 may be received by the control system 162 via the access network 120 and/or via satellite receiver 134. In one example, any one or more of the sensors 156 and/or 164 may have both cellular and non-cellular access capabilities and may further have wired communication and networking capabilities.

In one example, the second plurality of sensors 164 includes at least one auxiliary sensor $164_p$ that is designed to be tamper-resistant. In one example, the auxiliary sensor $164_p$ is a still or video camera. The auxiliary sensor $164_p$ may be protected within a housing 170 that is formed from a material that is resistant to wireless electronic signals (e.g., passing carrier waves, signals, lasers, and the like). For instance, the housing may be formed from a material that can block WiFi or cellular signals, such as ceramic, metal, mirrors, or the like. As such, the auxiliary sensor $164_p$ may be communicatively coupled to the control system 162 via a wired connection. In one example, the housing 170 is movable within a compartment 172 in the autonomous vehicle 160. In one example, the compartment 172 is large enough to completely conceal the housing 170 when the auxiliary sensor $164_p$ is not actively in use. However, the housing 170 may be configured to emerge at least partially from the compartment 172.

In one example, the auxiliary sensor $164_p$ may be powered off or may operate in an idle mode as a default, wherein the idle mode does not allow the auxiliary sensor $164_p$ to send or receive electronic signals to or from other devices. However, when a conflict is detected in the data received from two or more other sensors 164, the sensor $164_p$ may be activated (e.g., powered on or set to an active mode) in order to gather additional data to resolve the conflict. In one example, the housing 170 of the auxiliary sensor $164_p$ may be concealed within the compartment 172 as long as the auxiliary sensor $164_p$ is powered off or idle, but the housing 170 may emerge from the compartment at least temporarily when the auxiliary sensor $164_p$ is activated to allow the auxiliary sensor $164_p$ to gather data.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In addition, it should be noted that the network 100 may be implemented in a different form than that which is illustrated in FIG. 1, or may be expanded by including additional endpoint devices, access networks, network elements, application servers, and the like, without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2A:
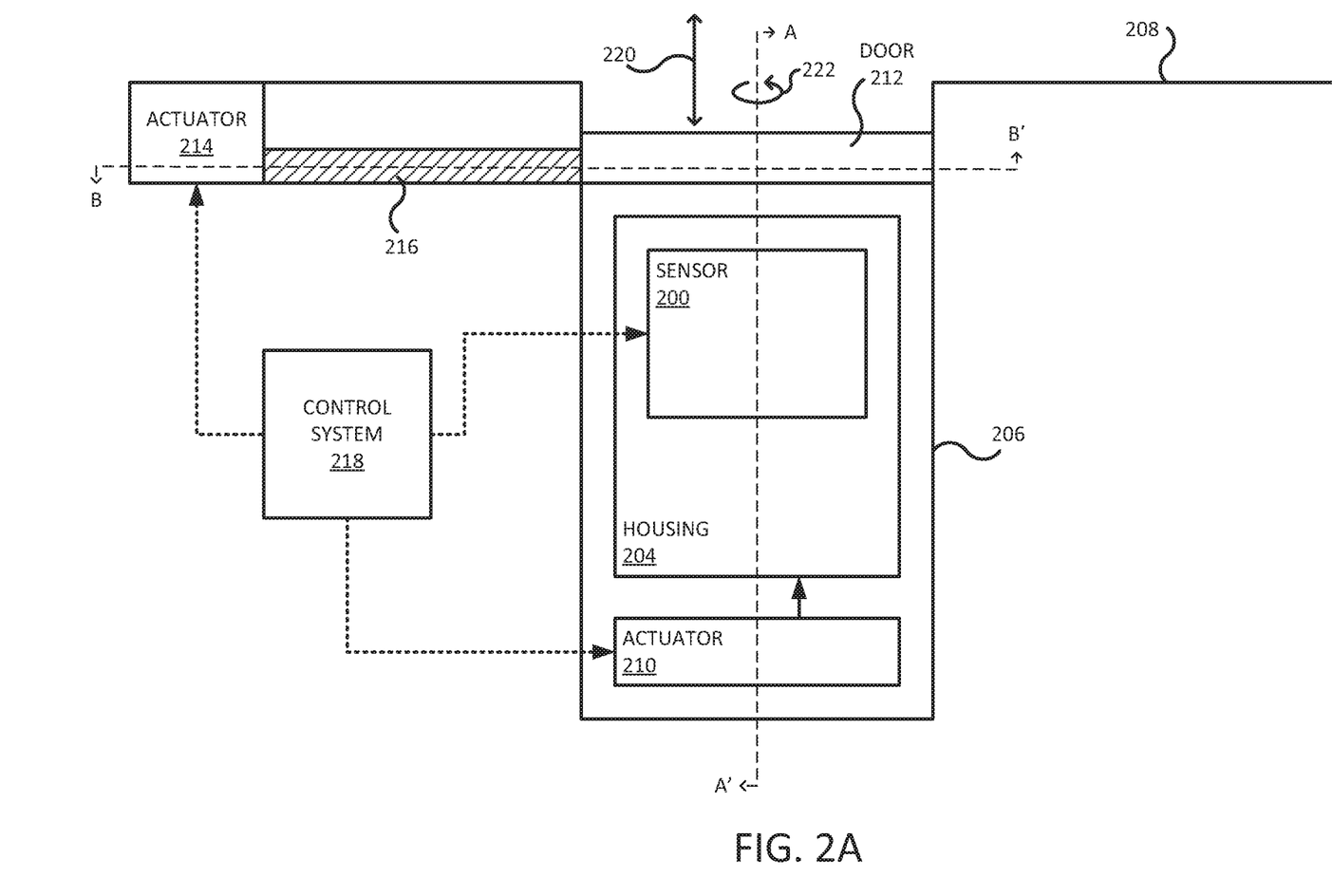
FIGS. 2A-2B are schematic diagrams illustrating one example of a tamper-resistant sensor for resolving sensor conflicts in autonomous vehicles.
Figure 2B:
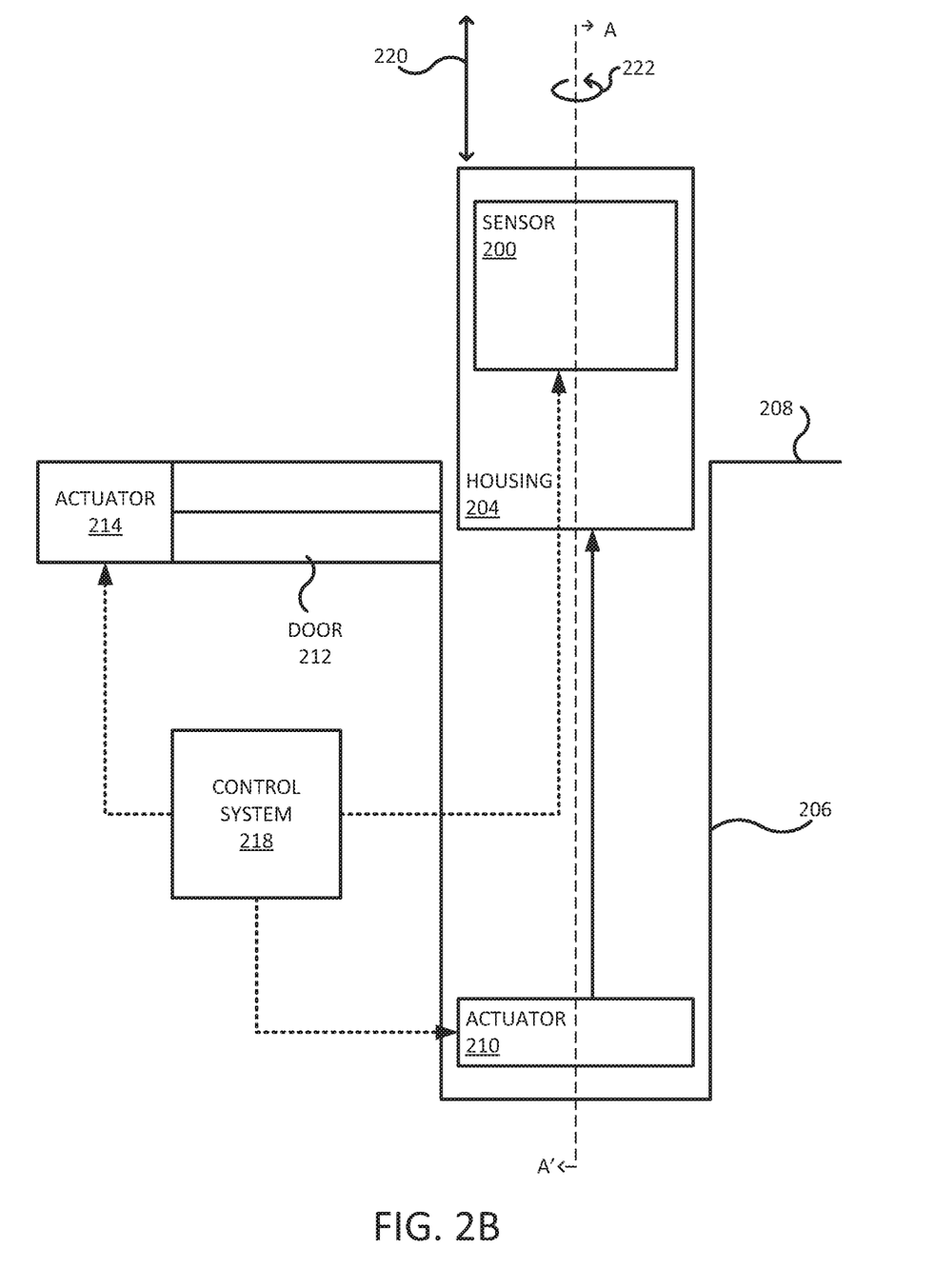

FIGS. 2A-2B are schematic diagrams illustrating one example of a tamper-resistant sensor 200 for resolving sensor conflicts in autonomous vehicles. Specifically, FIG. 2A illustrates the sensor 200 is a powered off or idle mode, while FIG. 2B illustrates the sensor 200 in an active mode. The sensor 200 may be deployed in an autonomous vehicle, such as the autonomous vehicle 160 of FIG. 1. Thus, the sensor 200 illustrated in FIG. 2 may be deployed as the auxiliary sensor $164_p$ illustrated in FIG. 1.

As discussed above, the sensor 200 may comprise a still or video camera. Thus, the sensor 200 may capture still images of sequences of images of a field of view. For instance, the sensor may comprise an infrared (IR) or near-infrared (NIR) camera, a red, blue, green (RGB) camera, an RGB-IR camera, a full-spectrum camera, or the like. In one example, the sensor 200 has a 360 degree field of view. For instance, if the sensor 200 is a camera, the camera may include an arrangement of lenses that provides a 360 degree field of view (e.g., back-to-back fisheye lenses). In another example, the sensor 200 may be coupled to a rotor or motor that adjusts the position of the lens in order to capture an image of a desired field of view.

As also discussed above, the sensor 200 may be protected within a housing 204 that is formed from a material that is resistant to wireless electronic signals (e.g., passing carrier waves, signals, lasers, and the like). For instance, the housing may be formed from a material that can block WiFi or cellular signals, such as ceramic, metal, mirrors, or the like. In one example, the housing 204 has a cylindrical shape.

In one example, the housing 204 may be connected to a first actuator 210. The first actuator 210 may be configured to drive the housing 204 (and, consequently, the sensor 200) linearly along an axis A-A' (as illustrated by the arrow 220), as well as to rotate the housing 204 around the axis A-A' (as illustrated by the arrow 222). In one example, the first actuator 210 may comprise any type of actuator, such as a mechanical actuator, a pneumatic actuator, a hydraulic actuator, an electric actuator, a thermal or magnetic actuator, or any combination thereof. For instance, the first actuator 210 may comprise a motor that drives a pneumatic cylinder, where the pneumatic cylinder is collinear with the axis A-A', and the housing 204 is mounted to the pneumatic cylinder.

As illustrated in FIG. 2A, the housing 204 and/or the first actuator 210 may be concealed within a compartment 206 formed within the body of the autonomous vehicle. The compartment 206 may comprise a hollow space in the vehicle body and may be similar in shape to the housing 204. For instance, the compartment 206 may be cylindrical in shape and have a slightly larger diameter than a diameter of the housing 204. However, the compartment 206 may be large enough to house the first actuator 210 in addition to the housing 204.

The compartment 206 may be open on one end that is flush or substantially flush with the exterior surface 208 of the autonomous vehicle. The compartment 206 may include a door 212 that is movable to open and close the end of the compartment 206. For instance, the door 212 may be connected to a second actuator 214. The second actuator 214 may be configured to drive the door 212 linearly along an axis B-B' that is substantially perpendicular to the axis A-A'. In one example, the second actuator 214 may comprise any type of actuator, such as a mechanical actuator, a pneumatic actuator, a hydraulic actuator, an electric actuator, a thermal or magnetic actuator, or any combination thereof. For instance, the second actuator 214 may comprise a motor that drives a pneumatic cylinder, where the pneumatic cylinder is collinear with the axis B-B', and the door 212 is mounted to the pneumatic cylinder. Thus, the door 212, may slide linearly to open and close the open end of the compartment 206. However, in other examples, the door 212 may be operable to open and close the open end of the compartment 206 in other ways. For instance, the door 212 may open and close on a hinge, or the door 212 may comprise two halves that slide linearly toward each other to close the open end and away from each other to open the open end.

The sensor 200, the first actuator 210, and the second actuator 214 may be communicatively coupled (e.g., by a wired communication link) to a control system 218. The control system 218 may comprise the central control system for the autonomous vehicle's various sensors (e.g., such as control system 162 of FIG. 1), or the control system 218 may comprise a control system for the sensor 200 only (in which case, the control system 218 may receive instructions from the central control system). Thus, the control system 218 may send electronic signals to the sensor 200, the first actuator 210, and the second actuator 214, where the electronic signals encode instructions for the sensor 200, the first actuator 210, and the second actuator 214.

As illustrated in FIG. 2A, the housing 204 and sensor 200 may, by default, be concealed within the compartment 206. For example, the housing 204 may be fully retracted into the compartment 206, and the door 212 may close the open end of the compartment 206. While concealed within the compartment 206, the sensor 200 may be powered off or may operate in an idle mode.

However, as illustrated in FIG. 2B, the housing 204 and sensor 200 may emerge from the compartment 206 when a conflict is detected between the data received from two or more of the autonomous vehicle's other sensors. In this case, the control system 218 may instruct the first actuator 210 to drive the housing 204 out of the compartment 206 (e.g., upward along the axis A-A'). The instruction to the first actuator 210 may include a precise identification of a location to which the first actuator 210 is to direct the sensor 200 (e.g., a direction and distance, or point along the 360 degree range of rotational motion of the housing 204). The control system 218 may also instruct the second actuator 214 to open the door 212, so that the housing 204 may emerge past the exterior surface 208 of the autonomous vehicle. The control system 218 may also instruct the sensor 200 to acquire data about the environment surrounding the autonomous vehicle. For instance, the instruction to the sensor 200 may cause the sensor 200 to enter an active mode in which the sensor 200 acquires one or more images of the surrounding environment. The sensor 200 may send these images to the control system 218 and/or to a central control system for the autonomous vehicle (if the control system 218 is not the central control system).

The configuration of the sensor 200 is not limited by what is illustrated in FIGS. 2A-2B. For instance, in other examples, the housing 204 may include a shutter or window over the sensor 200 that opens and closes. The shutter may remain closed as a default, and open only when the sensor 200 enters an active (e.g., data gathering) mode. The actuators 210 and 214 used to drive the housing 204 and the door 212 may also have configurations that differ from what is shown in FIGS. 2A-2B. In addition, it will be appreciated that the autonomous vehicle may include more than one sensor 200.

Figure 3:
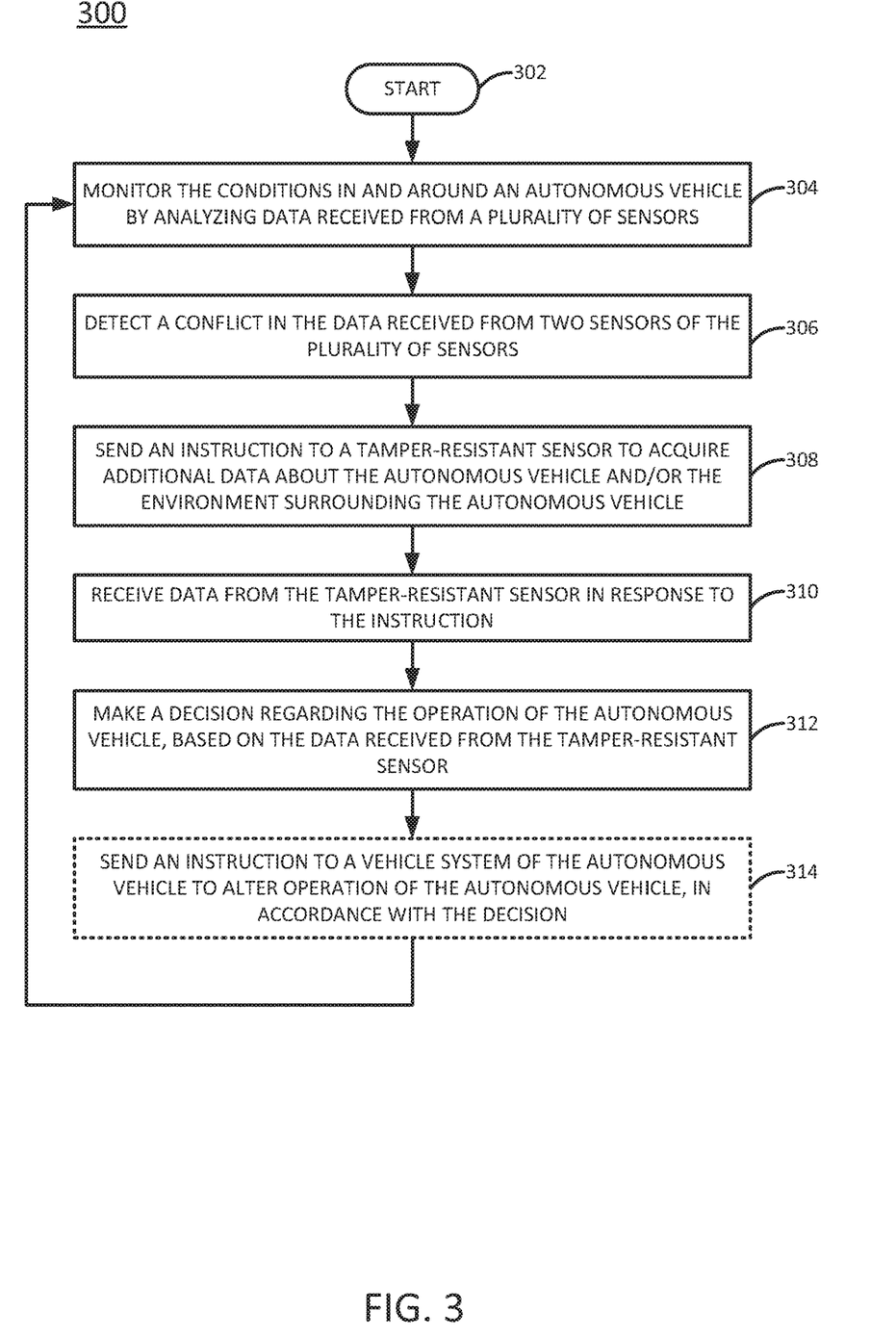
FIG. 3 illustrates a flowchart of an example method for resolving sensor conflicts in autonomous vehicles, according to examples of the present disclosure.

FIG. 3 illustrates a flowchart of an example method 300 for resolving sensor conflicts in autonomous vehicles, according to examples of the present disclosure. In one example, the steps, functions, or operations of the method 300 may be performed by a control system of an autonomous vehicle, where the control system receives information about the environment surrounding the autonomous vehicle from a plurality of sensors (and where the plurality of sensors may include sensors that are part of the autonomous vehicle as well as sensors that are external to the autonomous vehicle, such as sensors deployed along a roadway). Thus, in one example, the steps, functions, or operations of the method 300 may be performed, for example, by the control system 162 illustrated in FIG. 1 or the control system 218 illustrated in FIGS. 2A-2B.

In another example, the steps, functions, or operations of method 300 may be performed by a computing device or system 500, and/or processor 502 as described in connection with FIG. 5 below. Similarly, in one example, the steps, functions, and/or operations of the method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system.

The method 300 begins in step 302. In step 304, the processing system may monitor the conditions in and around an autonomous vehicle by analyzing data from a plurality of sensors. Some of the sensors may be deployed within the autonomous vehicle, while some of the sensors may be deployed externally to the autonomous vehicle, such as along or near a roadway on which the autonomous vehicle is traveling. The sensors may include, for example, radar sensors, LIDAR sensors, sonar sensors, GPS sensors, odometry and inertial measurement units, still and/or video cameras, humidity sensors, thermometers, barometers, and/or the like.

In step 306, the processing system may detect a conflict in the data received from two (or more) of the sensors. In one example, a conflict is detected when the data observed and reported by two sensors cannot simultaneously be true. For instance, images captured by a camera mounted on or near the hood of the autonomous vehicle may show that the roadway ahead of the autonomous vehicle is clear for at least one hundred feet. However, data captured by a radar sensor may indicate that there is an obstruction in the roadway approximately twenty feet in front of the autonomous vehicle. A conflict in the data may be a sign that one or more of the sensors has been compromised. For instance, a hacker may have gained access to the radar sensor and manipulated the data stream that is output by the radar sensor to make it appear as if the obstruction is in the roadway, when in reality there is no obstruction.

In step 308, the processing system may send an instruction to a tamper-resistant sensor to acquire additional data about the autonomous vehicle and/or the autonomous vehicle's surrounding environment. In one example, the tamper-resistant sensor remains in a powered off or idle mode by default, and is activated (e.g., enters an active or data gathering mode) only when the tamper-resistant sensor receives an instruction from the processing system. Thus, the tamper-resistant is not one of the sensors from which the processing system received data in step 304. Step 308 may include the processing system sending an instruction to the tamper-resistant sensor to enter an active mode. In a further example, a position of the tamper-resistant sensor may be adjustable to gather data from a desired location or direction. In this example, step 308 may also include the processing system sending an instruction to an actuator or other mechanism that specifies a desired position of the tamper-resistant sensor (e.g., "point the lens of the tamper-resistant sensor x degrees northwest").

In a further example, the tamper-resistant sensor may be wholly or partially concealed within the autonomous vehicle. For instance, a housing that protects the tamper-resistant sensor may be concealed within a compartment that opens upon a command from the processing system. Alternatively or in addition, a shutter may cover at least a portion of the tamper-resistant sensor when the tamper-resistant sensor is not gathering data. Thus, step 308 may include the processing system sending an instruction to one or more actuators or other mechanisms to uncover all or part of the tamper-resistant sensor.

In step 310, the processing system may receive data from the tamper-resistant sensor in response to the instruction sent in step 308. For instance, if the tamper-resistant sensor is a camera, the processing system may receive a still image or a sequence of images (e.g., a video) of a field of view that was requested in the instruction (e.g., images of a location that is x degrees northwest of the autonomous vehicle, if following the above example).

In step 312, the processing system may make a decision regarding operation of the autonomous vehicle, based at least in part on the data received from the tamper-resistant sensor in step 310. For instance, the data received from the tamper-resistant sensor may resolve the conflict detected in step 306. As an example, if the detected conflict related to the presence of an obstruction in the roadway ahead of the autonomous vehicle, the processing system may determine, based on the data received in step 310, that there is no obstruction. In this case, the processing system may determine that the autonomous vehicle should continue to operate in a current state (e.g., at a current speed and/or in a current direction of travel, etc.). Alternatively, the processing system may determine, based on the data received in step 310, that there is an obstruction. In this case, the processing system may determine that the autonomous vehicle should operate in an altered state (e.g., should change speed and/or direction of travel, etc.) to avoid the obstruction.

In optional step 314 (illustrated in phantom), the processing system may send an instruction to at least one vehicle system of the autonomous vehicle to alter the operation of the autonomous vehicle. For instance, if it is decided in step 312 that the autonomous vehicle should slow down or stop to avoid colliding with an obstacle, the processing system may send an instruction to the braking system of the autonomous vehicle requesting that the speed of the autonomous vehicle be reduced. Alternatively, if it is decided in step 312 that the autonomous vehicle should change its direction of travel to avoid colliding with an obstacle, the processing system may send an instruction to the steering system of the autonomous vehicle requesting that the autonomous vehicle veer to the left or to the right.

Once a decision regarding the operation of the autonomous vehicle is made in step 312 (and potentially acted upon in step 314), the method 300 may return to step 300 and continue to monitor the conditions in and around an autonomous vehicle, as discussed above, until or unless another conflict is detected.

Figure 4:
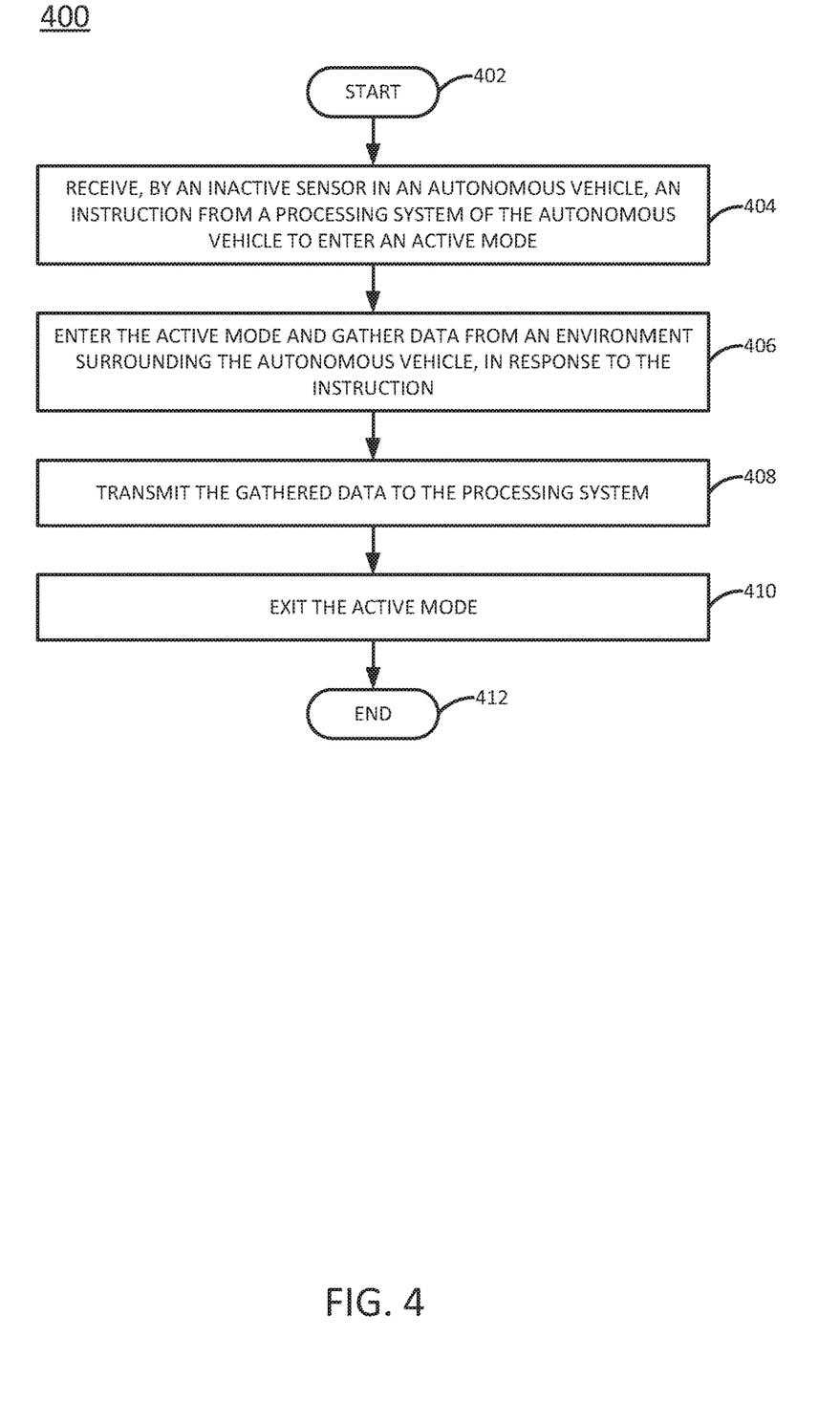
FIG. 4 illustrates a flowchart of an example method for operating a tamper-resistant sensor in an autonomous vehicle, according to examples of the present disclosure.

FIG. 4 illustrates a flowchart of an example method 400 for operating a tamper-resistant sensor in an autonomous vehicle, according to examples of the present disclosure. In one example, the steps, functions, or operations of the method 400 may be performed by a tamper-resistant sensor of an autonomous vehicle, where the tamper-resistant sensor gathers information about the environment surrounding the autonomous vehicle. Thus, in one example, the steps, functions, or operations of the method 400 may be performed, for example, by the auxiliary sensor $164_p$ illustrated in FIG. 1 or the sensor 200 illustrated in FIGS. 2A-2B.

The method 400 begins in step 402. In step 404, an inactive (e.g., powered off or operating in idle mode) sensor in an autonomous vehicle may receive an instruction from a processing system to enter an active (e.g., data gathering) mode. In one example, the processing system is a control system of the autonomous vehicle (e.g., a central system that gathers data from a plurality of sensors and analyzes the data to make decisions regarding the operation of the autonomous vehicle). In one example, the sensor is a still or video camera (e.g., an IR or NIR camera, an RGB camera, an RGB-IR camera, a full-spectrum camera, or the like).

In step 406, the sensor may enter the active mode and gather data from an environment surrounding the autonomous vehicle, in response to the instruction received in step 404. Thus, if the sensor is a camera, the sensor map capture an image or a series of images of the environment surrounding the autonomous vehicle. In one example, an actuator or other mechanism may position the sensor so that the gathered data depicts a specific location (e.g., a specific direction and distance, such as x degrees northwest of and y feet away from the autonomous vehicle) within the environment surrounding the autonomous vehicle.

In step 408, the sensor may transmit the data gathered in step 406 to the processing system. For instance, the data may be transmitted via a wired link between the sensor and the processing system.

In step 410, the sensor may exit the active mode (e.g., may power down or enter an idle mode). In one example, exiting the active mode involves entering a mode of operation in which the sensor does not transmit or receive electronic signals. In one example, the sensor exits the active mode automatically after transmitting the data in step 408. In another example, the sensor exits the active mode in response to an instruction from the processing system.

The method 400 ends in step 412.

Although not expressly specified above, one or more steps of the methods 300 and/or 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 3 and/or 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 5:
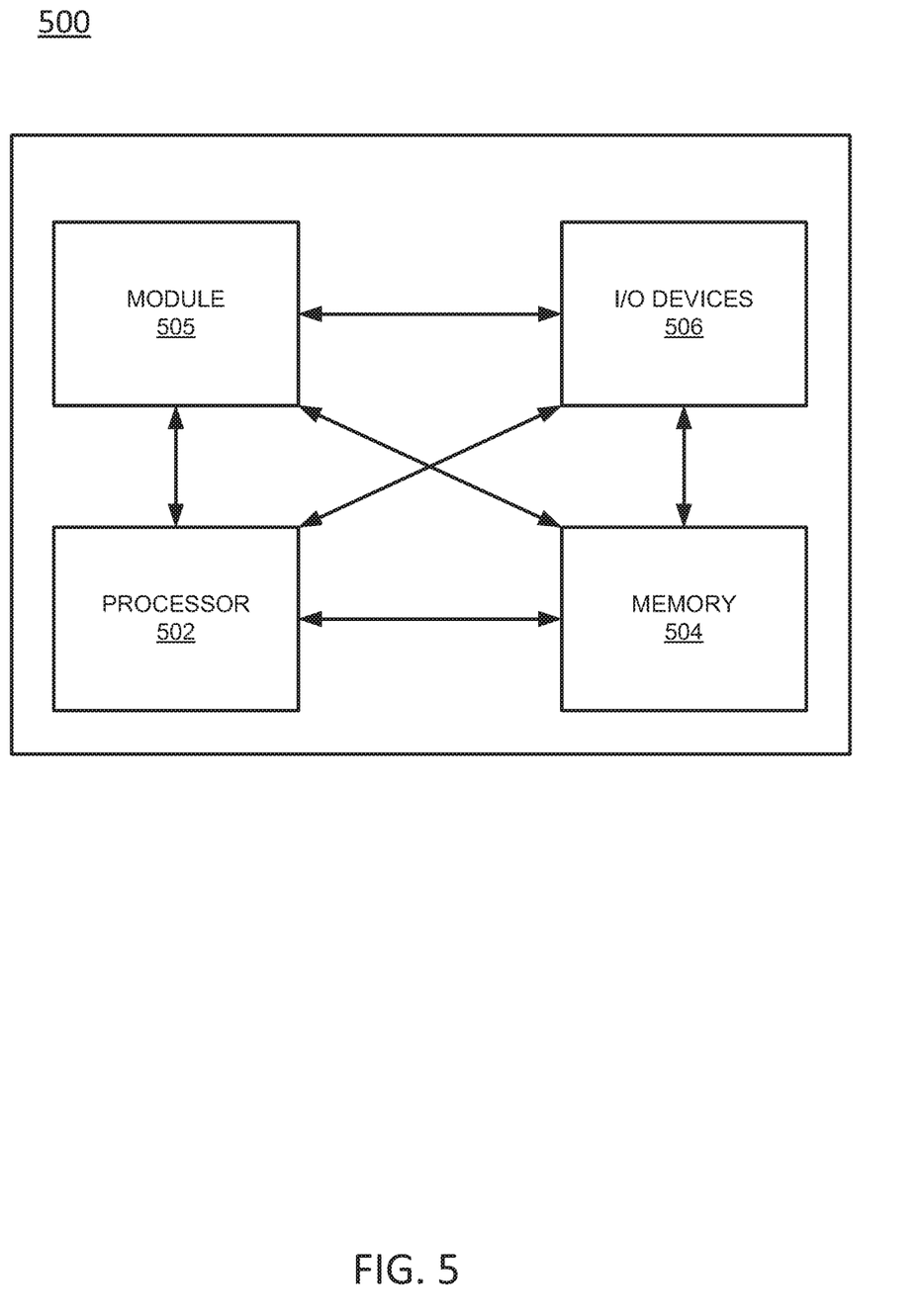
FIG. 5 depicts a high-level block diagram of a computing device specifically programmed to perform the functions described herein.

FIG. 5 depicts a high-level block diagram of a computing device specifically programmed to perform the functions described herein. For example, any one or more components or devices illustrated in FIG. 1 or 2A-2B or described in connection with the methods 300 or 400 may be implemented as the system 500. For instance, a control system of an autonomous vehicle (as illustrated t 162 in FIG. 1 or at 218 in FIGS. 2A-2B) could be implemented as illustrated in FIG. 5.

As depicted in FIG. 5, the system 500 comprises a hardware processor element 502, a memory 504, a module 505 for resolving sensor conflicts in autonomous vehicles, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for resolving sensor conflicts in autonomous vehicles may include circuitry and/or logic for performing special purpose functions relating to operating an autonomous vehicle. The input/output devices 506 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for resolving sensor conflicts in autonomous vehicles (e.g., a software program comprising computer-executable instructions) can be loaded into memory 504 and executed by hardware processor element 502 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for resolving sensor conflicts in autonomous vehicles (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
  monitoring, by a processing system of an autonomous vehicle, conditions around the autonomous vehicle by analyzing data received from a plurality of sensors;
  detecting, by the processing system, a conflict in the data received from two sensors of the plurality of sensors, wherein the conflict is detected when the data received from the two sensors cannot be simultaneously true;
  sending, by the processing system in response to the detecting the conflict in the data, a first instruction to an auxiliary sensor of the autonomous vehicle that is not one of the plurality of sensors, wherein the first instruction instructs the auxiliary sensor to gather additional data about the conditions around the autonomous vehicle;
  receiving, by the processing system, the additional data from the auxiliary sensor;
  making, by the processing system, a decision to alter an operation of the autonomous vehicle, wherein the decision is based at least in part on the additional data; and
  controlling, by the processing system, a vehicle system of the autonomous vehicle to alter the operation of the autonomous vehicle in accordance with the decision.

2. The method of claim 1, wherein the auxiliary sensor comprises a camera.

3. The method of claim 1, wherein the auxiliary sensor is protected within a housing that is formed from a material that is resistant to wireless electronic signals.

4. The method of claim 3, wherein the housing is movable into and out of a compartment formed in a body of the autonomous vehicle.

5. The method of claim 4, further comprising:
sending, by the processing system, a second instruction to an actuator of the autonomous vehicle, wherein the second instruction instructs the actuator to temporarily move the housing out of the compartment.

6. The method of claim 5, wherein the second instruction additionally instructs the actuator to adjust a direction and distance from which the auxiliary sensor captures the additional data.

7. The method of claim 1, wherein the auxiliary sensor remains in an inactive mode of operation as a default.

8. The method of claim 7, wherein the auxiliary sensor refrains from sending and receiving electronic signals in the inactive mode.

9. The method of claim 7, wherein the first instruction includes an instruction for the auxiliary sensor to enter an active mode of operation.

10. The method of claim 1, wherein the controlling comprises controlling a braking system of the autonomous vehicle to reduce a speed of the autonomous vehicle.

11. The method of claim 1, wherein the controlling comprises controlling a steering system of the autonomous vehicle to alter a direction of travel of the autonomous vehicle.

12. The method of claim 1, wherein the plurality of sensors continuously send the data to the processing system, but the auxiliary sensor only sends the additional data to the processing system when the auxiliary sensor receives the first instruction.

13. The method of claim 1, wherein the additional data received from the auxiliary sensor resolves the conflict.

14. A system comprising:
a plurality of sensors distributed throughout an autonomous vehicle to continuously gather data about conditions around the autonomous vehicle;
a processing system to monitor the conditions based on the data gathered by the plurality of sensors;
an auxiliary sensor mounted in the autonomous vehicle, wherein the auxiliary sensor operates in an inactive mode as a default, and wherein the auxiliary sensor does not gather data or transmit data in the inactive mode; and
a non-transitory computer-readable medium storing instructions which, when executed by the processing system, cause the processing system to perform operations, the operations comprising:
detecting a conflict in the data received from two sensors of the plurality of sensors, wherein the conflict is detected when the data received from the two sensors cannot be simultaneously true;
sending, in response to the detecting the conflict in the data, a first instruction to the auxiliary sensor, wherein the first instruction instructs the auxiliary sensor to enter an active mode in which the auxiliary sensor gathers additional data about the conditions around the autonomous vehicle;
receiving the additional data from the auxiliary sensor;
making a decision to alter an operation of the autonomous vehicle, wherein the decision is based at least in part on the additional data; and
controlling a vehicle system of the autonomous vehicle to alter the operation of the autonomous vehicle in accordance with the decision.

15. The system of claim 14, further comprising:
a housing protecting the auxiliary sensor, wherein the housing is formed from a material that is resistant to wireless electronic signals.

16. The system of claim 15, further comprising:
an actuator coupled to the housing to move the housing into and out of a compartment formed in a body of the autonomous vehicle and to adjust a direction and distance from which the auxiliary sensor gathers data.

17. The system of claim 16, wherein the compartment conceals the auxiliary sensor when the housing is moved into the compartment.

18. The system of claim 14, wherein the auxiliary sensor is a camera.

19. A non-transitory computer-readable storage medium storing instructions which, when executed by a processing system of an autonomous vehicle, cause the processing system to perform operations, the operations comprising:
monitoring conditions around the autonomous vehicle by analyzing data received from a plurality of sensors;
detecting a conflict in the data received from two sensors of the plurality of sensors, wherein the conflict is detected when the data received from the two sensors cannot be simultaneously true;
sending, in response to the detecting the conflict in the data, a first instruction to an auxiliary sensor of the autonomous vehicle that is not one of the plurality of sensors, wherein the first instruction instructs the auxiliary sensor to gather additional data about the conditions around the autonomous vehicle;
receiving the additional data from the auxiliary sensor;
making a decision to alter an operation of the autonomous vehicle, wherein the decision is based at least in part on the additional data; and
controlling a vehicle system of the autonomous vehicle to alter the operation of the autonomous vehicle in accordance with the decision.

20. The non-transitory computer-readable storage medium of claim 19, wherein the vehicle system comprises a braking system or a steering system.

* * * * *